(12) United States Patent
Fukudome et al.

(10) Patent No.: US 12,037,007 B2
(45) Date of Patent: Jul. 16, 2024

(54) TRAVELING VIDEO DISPLAY METHOD AND TRAVELING VIDEO DISPLAY SYSTEM

(71) Applicant: TOYOTA JIDOSHA KABUSHIKI KAISHA, Toyota (JP)

(72) Inventors: Hideki Fukudome, Toyota (JP); Kosuke Akatsuka, Mishima (JP); Myu Uehara, Nisshin (JP); Tsukasa Kito, Aisai (JP); Satoshi Omi, Ebina (JP); Yuki Nishikawa, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 2 days.

(21) Appl. No.: 17/885,971

(22) Filed: Aug. 11, 2022

(65) Prior Publication Data

US 2023/0017458 A1  Jan. 19, 2023

(30) Foreign Application Priority Data

Aug. 19, 2021  (JP) ................. 2021-134028

(51) Int. Cl.
*B60Q 1/00* (2006.01)
*B60W 40/072* (2012.01)
(Continued)

(52) U.S. Cl.
CPC .......... *B60W 50/14* (2013.01); *B60W 40/072* (2013.01); *B60W 50/08* (2013.01);
(Continued)

(58) Field of Classification Search
CPC .... B60W 50/14; B60W 40/072; B60W 40/08; B60W 2540/225; B60W 2540/229; B60W 2552/30; B60W 2050/146; B60W 2300/14; B60W 2420/42; G05D 1/0038; G05D 2201/0213
(Continued)

(56) References Cited

U.S. PATENT DOCUMENTS 9,507,346 B1    11/2016  Levinson et al.
9,535,423 B1 *   1/2017  Debreczeni ............ G06V 20/58
(Continued)

FOREIGN PATENT DOCUMENTS

JP    H10-145777 A    5/1998
JP    2000-284214 A   10/2000
(Continued)

*Primary Examiner* — Naomi J Small
(74) *Attorney, Agent, or Firm* — Dinsmore & Shohl LLP

(57) ABSTRACT

A method according to the present disclosure comprises acquiring a plurality sets of traveling video recorded by a plurality of cameras capturing a plurality of directions equipped in a remote driving vehicle, acquiring information regarding at least one of driving operation by a remote driving operator, a traveling state of the remote driving vehicle, and motion of the remote driving operator, specifying an attention direction or an attention scope of the remote driving operator for a situation around the remote driving vehicle based on acquired information, displaying at least one of the plurality sets of traveling video reflecting the attention direction or the attention scope on a display device, and performing display based on the attention direction or the attention scope.

18 Claims, 10 Drawing Sheets

(51) Int. Cl.
  *B60W 50/08*  (2020.01)
  *B60W 50/14*  (2020.01)
  *G05D 1/00*  (2006.01)

(52) U.S. Cl.
  CPC ..... *G05D 1/0038* (2013.01); *B60W 2050/146* (2013.01); *B60W 2300/14* (2013.01); *B60W 2420/403* (2013.01); *B60W 2540/225* (2020.02); *B60W 2540/229* (2020.02); *B60W 2552/30* (2020.02)

(58) Field of Classification Search
  USPC ....................................................... 340/439
  See application file for complete search history.

(56) References Cited

U.S. PATENT DOCUMENTS

| | | | |
|---|---|---|---|
| 11,142,192 B2* | 10/2021 | Hayamizu | B60W 10/20 |
| 11,215,982 B2 | 1/2022 | Urano et al. | |
| 11,325,618 B2 | 5/2022 | Umeda | |
| 2017/0131713 A1 | 5/2017 | Burkhart et al. | |
| 2018/0134285 A1* | 5/2018 | Cho | B60W 10/06 |
| 2019/0137999 A1 | 5/2019 | Taguchi et al. | |
| 2020/0001883 A1* | 1/2020 | Jung | G06V 20/597 |
| 2020/0209888 A1 | 7/2020 | Sakai et al. | |
| 2020/0326702 A1 | 10/2020 | Iwamoto et al. | |
| 2021/0016795 A1 | 1/2021 | Matsushita et al. | |
| 2021/0016799 A1 | 1/2021 | Matsushita et al. | |
| 2021/0027625 A1 | 1/2021 | Jung et al. | |
| 2021/0041894 A1 | 2/2021 | Urano et al. | |
| 2021/0055741 A1 | 2/2021 | Kawanai et al. | |
| 2021/0058173 A1 | 2/2021 | Otaki et al. | |
| 2021/0072743 A1 | 3/2021 | Otaki et al. | |
| 2021/0080943 A1 | 3/2021 | Iwamoto et al. | |
| 2021/0263513 A1* | 8/2021 | Liu | G05D 1/0225 |
| 2021/0325871 A1 | 10/2021 | Taguchi et al. | |

FOREIGN PATENT DOCUMENTS

| | | |
|---|---|---|
| JP | 2011-009823 A | 1/2011 |
| JP | 2016-134816 A | 7/2016 |
| JP | 2017-522665 A | 8/2017 |
| JP | 2018-077649 A | 5/2018 |
| JP | 2018-538647 A | 12/2018 |
| JP | 2021-011233 A | 2/2021 |
| WO | 2017/079219 A1 | 5/2017 |

* cited by examiner

TRAVELING VIDEO DISPLAY METHOD AND TRAVELING VIDEO DISPLAY SYSTEM

CROSS-REFERENCE TO RELATED APPLICATION

The present disclosure claims priority under 35 U.S.C. § 119 to Japanese Patent Application No. 2021-134028, filed on Aug. 19, 2021, which is incorporated herein by reference in its entirety.

BACKGROUND

Technical Field

The present disclosure relates to a method and a system displaying a plurality sets of traveling video of a vehicle on a display device related to remote driving.

Background Art

In recent years, a remote driving technique has been devised in which remote driving of a vehicle is performed from a remote place. The remote driving is expected as a technique for implementing alternative or unmanned driving service in the case where autonomous driving becomes difficult in an autonomous vehicle. Examples of prior arts related to the remote driving can include Patent Literature 1.

List of Related Art

Patent Literature 1: JP 2018-77649 A

SUMMARY

A remote driving operator mainly grasps a situation around a remote driving vehicle by visually recognizing the plurality sets of traveling video displayed on a display device, and appropriately performs a driving operation. At this time, unlike an operator who boards and drives the vehicle, the remote driving operator cannot perform visual check directly, and therefore it is desirable that the plurality sets of traveling video to be displayed on the display device sufficiently reflects respective directions around the remote driving vehicle. However, a display area of the display device which is intentionally and visually recognizable by the remote driving operator is limited. This limits the number and range of the plurality sets of traveling video displayable in the display area which can be easily and visually recognized by the remote driving operator in a stable manner, among the plurality sets of traveling video reflecting respective directions around the vehicle. Furthermore, an attention direction or an attention scope to be checked by the remote driving operator varies depending on the situation around the remote driving vehicle and the driving situation of the remote driving vehicle.

Accordingly, the traveling video reflecting the attention direction or the attention scope of the remote driving operator is sometimes not properly displayed on the display device. Furthermore, since the situation around the remote driving vehicle and the driving situation of the remote driving vehicle may vary from time to time, the operation and monitoring loads applied to the remote driving operator may excessively increase.

The present disclosure has been made in view of the above-described problem, and an object of the present disclosure is to provide a traveling video display method and a traveling video display system which allow plurality sets of traveling video reflecting the attention direction or the attention scope of a remote driving operator to be properly displayed on a display device without increasing operation and monitoring loads applied to the remote driving operator.

A first disclosure is directed to a method displaying a plurality sets of traveling video of a remote driving vehicle on a display device.

The method comprises:
acquiring the plurality sets of traveling video recorded by a plurality of cameras capturing a plurality of directions equipped in the remote driving vehicle;
acquiring information regarding at least one of driving operation by a remote driving operator of the remote driving vehicle, a traveling state of the remote driving vehicle, and motion of the remote driving operator;
specifying an attention direction or an attention scope of the remote driving operator for a situation around the remote driving vehicle based on acquired information;
displaying at least one of the plurality sets of traveling video reflecting the attention direction or the attention scope on the display device; and
performing display based on the attention direction or the attention scope.

A second disclosure is directed to a method further including the following features with respect to the method according to the first disclosure.

The performing display based on the attention direction or the attention scope includes highlighting at least one of the plurality sets of traveling video reflecting the attention direction or the attention scope.

A third disclosure is directed to a method further including the following features with respect to the method according to the first disclosure.

The method further comprises displaying at least one of the plurality sets of traveling video reflecting a predetermined direction or a predetermined scope on the display device.

A fourth disclosure is directed to a method further including the following features with respect to the method according to the first disclosure.

the specifying the attention direction or the attention scope includes specifying, as the attention direction, a direction at which the remote driving operator is looking.

A fifth disclosure is directed to a method further including the following features with respect to the method according to the first disclosure.

the acquiring information includes acquiring operation of turn signals or a steering apparatus, and
the specifying the attention direction or the attention scope includes:
  when leftward operation of the turn signals or the steering apparatus is performed, specifying, as the attention direction, a leftward direction of the remote driving vehicle, and
  when rightward operation of the turn signals or the steering apparatus is performed, specifying, as the attention direction, a rightward direction of the remote driving vehicle.

A sixth disclosure is directed to a method further including the following features with respect to the method according to the first disclosure.

the specifying the attention direction or the attention scope includes, when a predetermined brake operation of the remote driving vehicle is performed, specifying, as the attention direction, a rearward direction.

A seventh disclosure is directed to a method further including the following features with respect to the method according to the first disclosure.

the specifying the attention direction or the attention scope includes, when a head lamp the remote driving vehicle is set to high beam, specifying, as the attention scope, a distant place of one of the plurality sets of traveling video reflecting a frontward direction of the remote driving vehicle, and the performing display based on the attention direction or the attention scope includes, when the attention scope is the distant place, setting an angle of view of the one of the plurality sets of traveling video reflecting the frontward direction upward by a predetermined height with respect to a reference.

An eighth disclosure is directed to a method further including the following features with respect to the method according to the first disclosure.

the acquiring information includes acquiring a vehicle speed of the remote driving vehicle, and the performing display based on the attention direction or the attention scope includes setting an angle of view of one of the plurality sets of traveling video reflecting a frontward direction upward or downward by a height according to the vehicle speed with respect to a reference.

A ninth disclosure is directed to a method further including the following features with respect to the method according to the first disclosure.

the specifying the attention direction or the attention scope includes, when the remote driving vehicle is traveling on a curved road, specifying, as the attention direction, a direction which the curved road is going.

A tenth disclosure is directed to a method further including the following features with respect to the method according to the fifth disclosure.

the remote driving vehicle is a towing vehicle, the plurality of cameras includes at least one camera equipped in a towed vehicle towed by the towing vehicle, and the performing display based on the attention direction or the attention scope includes, when the attention direction is the leftward direction or the rightward direction of the towing vehicle, displaying traveling video recorded by the at least one camera equipped in the towed vehicle on the display device.

An eleventh disclosure is directed to a system displaying a plurality sets of traveling video of a remote driving vehicle on a display device.

The system comprises:

a plurality of cameras capturing a plurality of directions equipped in the remote driving vehicle; and a processing apparatus.

The processing apparatus is configured to execute:

acquiring the plurality sets of traveling video recorded by the plurality of cameras;

acquiring information regarding at least one of driving operation by a remote driving operator of the remote driving vehicle, a traveling state of the remote driving vehicle, and motion of the remote driving operator;

specifying an attention direction or an attention scope of the remote driving operator for a situation around the remote driving vehicle based on acquired information;

displaying at least one of the plurality sets of traveling video reflecting the attention direction or the attention scope on the display device; and performing display based on the attention direction or the attention scope.

A twelfth disclosure is directed to a system further including the following features with respect to the system according to the eleventh disclosure.

he performing display based on the attention direction or the attention scope includes highlighting at least one of the plurality sets of traveling video reflecting the attention direction or the attention scope.

A thirteenth disclosure is directed to a system further including the following features with respect to the system according to the eleventh disclosure.

the processing apparatus is further configured to execute displaying at least one of the plurality sets of traveling video reflecting a predetermined direction or a predetermined scope on the display device.

A fourteenth disclosure is directed to a system further including the following features with respect to the system according to the eleventh disclosure.

the specifying the attention direction or the attention scope includes specifying, as the attention direction, a direction at which the remote driving operator is looking.

A fifteenth disclosure is directed to a system further including the following features with respect to the system according to the eleventh disclosure.

the acquiring information includes acquiring operation of turn signals or a steering apparatus, and the specifying the attention direction or the attention scope includes:

when leftward operation of the turn signals or the steering apparatus is performed, specifying, as the attention direction, a leftward direction of the remote driving vehicle, and when rightward operation of the turn signals or the steering apparatus is performed, specifying, as the attention direction, a rightward direction of the remote driving vehicle.

A sixteenth disclosure is directed to a system further including the following features with respect to the system according to the eleventh disclosure.

the specifying the attention direction or the attention scope includes, when a predetermined brake operation of the remote driving vehicle is performed, specifying, as the attention direction, a rearward direction.

A seventeenth disclosure is directed to a system further including the following features with respect to the system according to the eleventh disclosure.

the specifying the attention direction or the attention scope includes, when a head lamp of the remote driving vehicle is set to high beam, specifying, as the attention scope, a distant place of one of the plurality sets of traveling video reflecting a frontward direction of the remote driving vehicle, and the performing display based on the attention direction or the attention scope includes, when the attention scope is the distant place, setting an angle of view of the one of the plurality sets of traveling video reflecting the frontward direction upward by a predetermined height with respect to a reference.

An eighteenth disclosure is directed to a system further including the following features with respect to the system according to the eleventh disclosure.

the acquiring information includes acquiring a vehicle speed of the remote driving vehicle, and the performing display based on the attention direction or the attention scope includes setting an angle of view of one of the plurality sets of traveling video reflecting a frontward direction upward or downward by a height according to the vehicle speed with respect to a reference.

A nineteenth disclosure is directed to a system further including the following features with respect to the system according to the eleventh disclosure.

the specifying the attention direction or the attention scope includes, when the remote driving vehicle is traveling on a curved road, specifying, as the attention direction, a direction which the curved road is going.

A twelfth disclosure is directed to a system further including the following features with respect to the system according to the fifteenth disclosure.

the remote driving vehicle is a towing vehicle, the plurality of cameras includes at least one camera equipped in a towed vehicle towed by the towing vehicle, and the performing display based on the attention direction or the attention scope includes, when the attention direction is the leftward direction or the rightward direction of the towing vehicle, displaying traveling video recorded by the at least one camera equipped in the towed vehicle on the display device.

According to the present disclosure, the attention direction or the attention scope of the remote driving operator is specified. The plurality sets of traveling video reflecting the specified attention direction or the specified attention scope are displayed on the display device. And displaying the plurality sets of traveling video on the display device is performed based on the the specified attention direction or the specified attention scope. This enables the plurality sets of traveling video reflecting the attention direction or the attention scope of the remote driving operator to be properly displayed on the display device without increasing operation and monitoring loads applied to the remote driving operator.

EMBODIMENTS

Hereinafter, embodiments of the present disclosure will be described with reference to the accompanying drawings. However, it is to be understood that even when the number, quantity, amount, range or other numerical attribute of each element is mentioned in the following description of the embodiment, the concept according to the present disclosure is not limited to the mentioned numerical attribute unless explicitly described otherwise, or unless the present disclosure is explicitly specified by the numerical attribute theoretically. Furthermore, structures or the like that are described in conjunction with the following embodiment is not necessary to the concept of the present disclosure unless explicitly described otherwise, or unless the present disclosure is explicitly specified by the structures or the like theoretically. In each figure, the same reference signs are assigned to the same or corresponding components, and redundant description is appropriately simplified or omitted.

1. INTRODUCTION

1-1. Remote Driving Device

A traveling video display system according to the present embodiment displays plurality sets of traveling video of a remote driving vehicle on a display device. Here, the remote driving is typically performed by a remote driving operator operating a remote driving device at a location remote from a remote driving vehicle.

Figure 1:
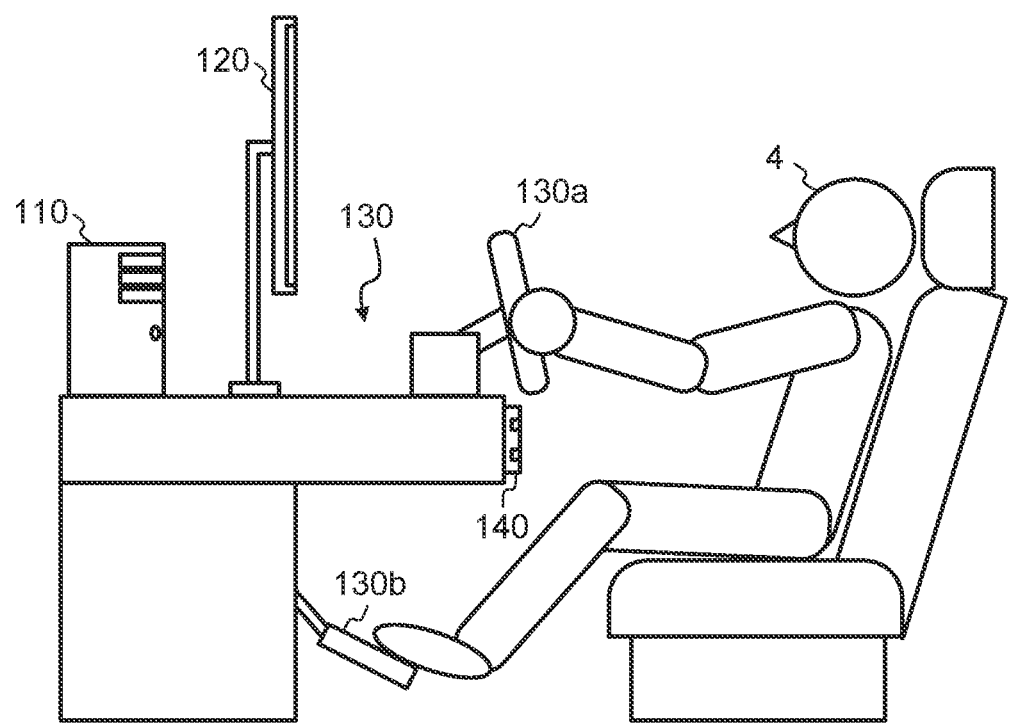
FIG. 1 is a conceptual diagram illustrating an example of a remote driving device.

FIG. 1 is a conceptual diagram illustrating an example of a remote driving device 100. The remote driving device 100 is a device configured to provide information related to driving (plurality sets of traveling video, a driving environment, and the like) to the remote driving operator 4 and accept an operation by the remote driving operator 4 (an operation related to driving, an operation of a device provided on a remote driving vehicle, and the like), thereby implementing remote driving by a remote driving operator 4.

The remote driving device 100 illustrated in FIG. 1 includes a processing apparatus 110, a display device 120, a driving operation device 130, and an operation panel 140.

The processing apparatus 110 is a device configured to execute processing related to remote driving. The processing apparatus 110 is typically a computer including a memory and a processor. The processing apparatus 110 is configured to be capable of mutually communicating information with the display device 120, the driving operation device 130, and the operation panel 140. Typically, these are electrically connected with cables. However, the processing apparatus 110 may be configured to be capable of mutually communicating information by communication. For example, the processing apparatus 110 may be a server (may be implemented virtually) configured on a communication network (e.g., the Internet) communicable with the display device 120, the driving operation device 130, and the operation panel 140.

Furthermore, the processing apparatus 110 is configured to communicate with the remote driving vehicle, thereby enabling transmission and reception of the information. The processing apparatus 110 is typically connected to a communication network (e.g., the Internet) communicable with the remote driving vehicle, thereby transmitting and receiving the information.

In addition, the processing apparatus 110 executes processing related to a display on the display device 120. That is, in the remote driving device 100 illustrated in FIG. 1, the processing apparatus 110 also functions as a display processing device. Hereinafter, the processing apparatus 110 may be referred to as the display processing device 110. The display processing device 110 transmits a signal (display signal) causing the display device 120 to display a specific display. The display processing device 110 at least acquires plurality sets of traveling video from a plurality of cameras equipped in the remote driving vehicle, and performs processing of displaying the plurality sets of traveling video on the display device 120. In addition, the display processing device 110 may perform processing of displaying a map around the remote driving vehicle, an image indicating control setting of the remote driving vehicle, or the like.

The display device 120 performs a display according to a display signal obtained from the display processing device 110. The display device 120 is typically a display apparatus such as a liquid crystal display, or an organic EL display. The display device 120 may be another device having a proper display function. In addition, the display device 120 may be a system comprised of a plurality of devices. For example, the display device 120 may be a multi-monitor formed by connecting a plurality of display apparatuses. At least plurality sets of traveling video are displayed on the display device 120. The details of the plurality sets of traveling video to be displayed on the display device will be described later.

The driving operation device 130 is a device configured to accept an operation related to driving by the remote driving operator 4. FIG. 1 illustrates, as the driving operation device 130, a steering wheel 130a for accepting a steering operation and a pedal 130b for accepting an acceleration or braking operation. An operation signal accepted by the driving operation device 130 is transmitted to the remote driving vehicle via the processing apparatus 110.

The operation panel 140 is a device configured to accept various operations by the remote driving operator 4. For example, the operation panel 140 accepts an operation (turning on or off of an accessory function, opening or closing of a door, or the like) of the device equipped in the remote driving vehicle. Furthermore, the operation panel 140 may accept an operation (switching of the display, an electronic control operation of a seat, or the like) of the device provided in the remote driving device 100. The form of the operation panel 140 is, for example, a switch or a touch screen.

Note that the remote driving device 100 may include the other devices. For example, the remote driving device 100 may include an acoustic device for conveying sound to the remote driving operator 4, a sensor for detecting a state of the remote driving operator 4, or the like.

The remote driving operator 4 grasps the situation around the remote driving vehicle by visually recognizing a display (mainly the plurality sets of traveling video) on the display device 120, and appropriately operates the driving operation device 130 or the operation panel 140. This enables the remote driving to be performed by the remote driving operator 4.

1-2. Display of Traveling Videos

Figure 2A:
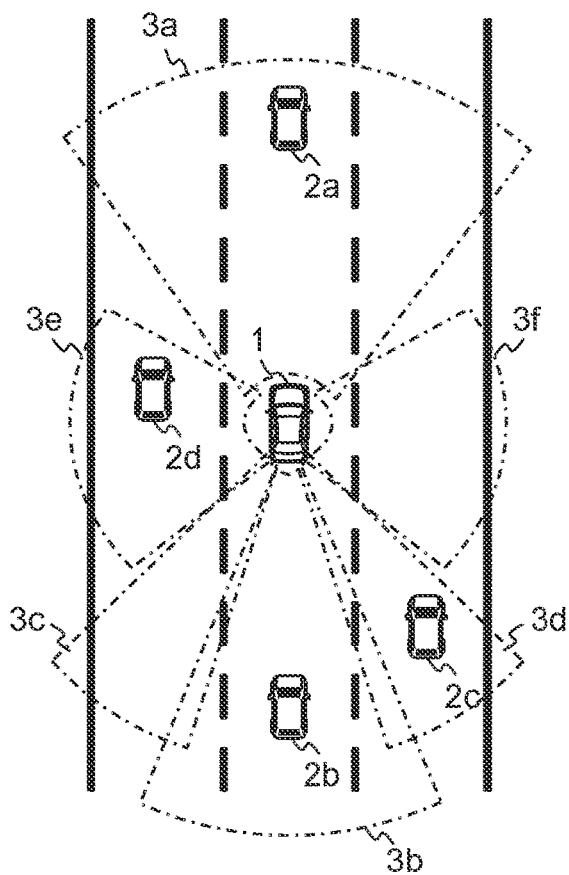
FIG. 2A is a conceptual diagram illustrating an example of plurality sets of traveling video recorded by a plurality of cameras capturing a plurality of directions equipped in a remote driving vehicle.
Figure 2B:
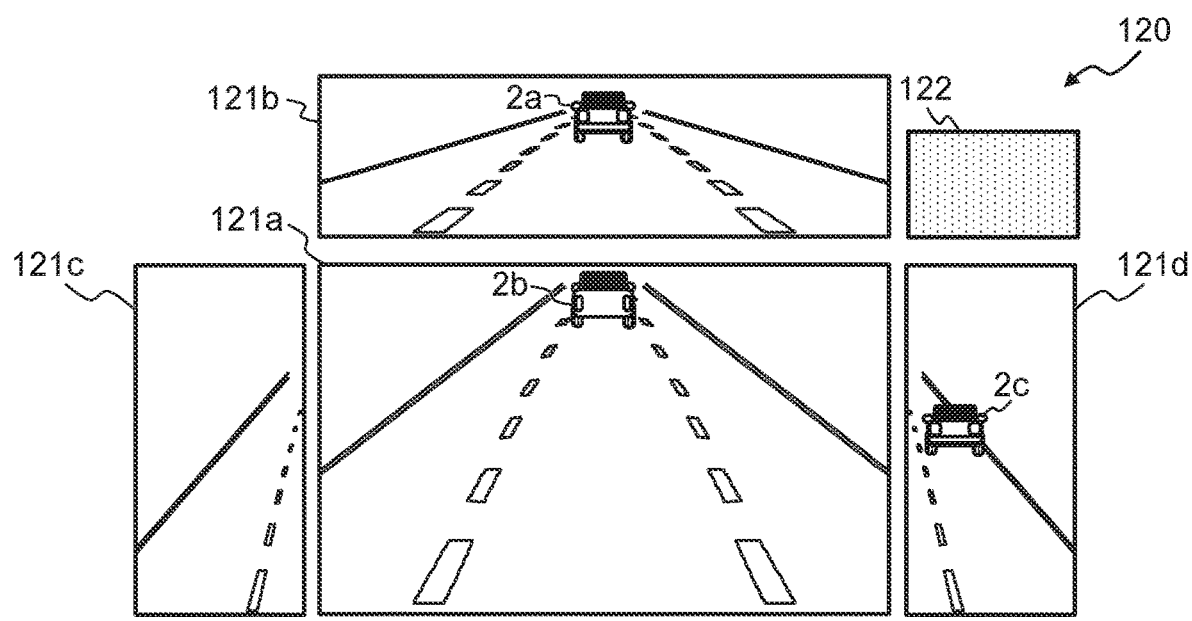
FIG. 2B is a conceptual diagram illustrating an example of plurality sets of traveling video recorded by the plurality of cameras.

Traveling videos to be displayed on the display device 120 by the display processing device 110 will be described below with reference to FIG. 2A and FIG. 2B. FIG. 2A and FIG. 2B illustrate an example of plurality sets of traveling video 121 recorded by a plurality of cameras capturing a plurality of directions equipped in a remote driving vehicle 1. Here, a plurality of other vehicles 2 are traveling around the remote driving vehicle 1. Note that in FIG. 2A and FIG. 2B, a suffix (a, b, or the like) is added to the reference numeral to individually distinguish among the other vehicles 2.

FIG. 2A illustrates an example of video capturing regions 3 recorded by the plurality of cameras equipped in the remote driving vehicle 1. Note that in FIG. 2A, a suffix (a, b, or the like) is added to the reference numeral to individually distinguish among the video capturing regions 3. In FIG. 2A and FIG. 2B, six cameras are equipped in the remote driving vehicle 1, and the plurality sets of traveling video 121 in six directions corresponding to the respective video capturing regions 3 are recorded.

FIG. 2B illustrates an example of plurality sets of traveling video 121 displayed on the display device 120, the plurality sets of traveling video 121 corresponding to FIG. 2A. Note that in FIG. 2B, a suffix (a, b, or the like) is added to the reference numeral of the plurality sets of traveling video 121 to correspond to the respective video capturing regions 3 illustrated in FIG. 2A. In FIG. 2B, another arbitrary display 122 is displayed on the display device 120. The another arbitrary display 122 is, for example, display of the state of the device included in the remote driving vehicle 1 (a turning on or off state of an accessory function, an opening or closing state of a door, or the like), display of a driving environment (a vehicle speed, a fuel level, an internal temperature of the vehicle, or the like), display of a map, display of navigation, or other display.

In FIG. 2B, the traveling video 121a, 121b, 121c, and 121d corresponding to the video capturing regions 3a, 3b, 3c, and 3d, respectively, are provided as display on the display device 120. However, the plurality sets of traveling video 121 corresponding to the video capturing regions 3e and 3f are not displayed. The display area of the traveling video 121a in the frontward direction of the remote driving vehicle 1 is the largest, and the display area of each of the plurality sets of traveling video 121c and 121d in the rearward left and right side directions of the remote driving vehicle 1 is small.

Meanwhile, in the display illustrated in the example of FIG. 2B, the remote driving operator 4 cannot check the left and right side directions of the remote driving vehicle 1.

Therefore, the remote driving operator 4 cannot check the presence of another vehicle 2d. When the remote driving operator 4 wants to change a lane of the remote driving vehicle 1, it is necessary to check the left and right side directions of the remote driving vehicle 1. And when the remote driving operator 4 wants to change a lane of the remote driving vehicle 1, it is necessary to check the display of the traveling video 121c or 121d in the rearward left and right side directions more particularly than the display of the traveling video 121a in the frontward direction. In this way, the display illustrated in FIG. 2B may be unsuitable as the plurality sets of traveling video 121 in the attention direction or the attention scope to be checked by the remote driving operator 4 depending on the situation around the remote driving vehicle 1 or the driving situation of the remote driving vehicle 1.

It might be considered to employ the display device 120 having a large display area for displaying the plurality sets of traveling video 121 of sufficient and a variety of patterns. For example, the display device 120 may be configured as a multi-monitor to display the display illustrated in FIG. 2B on a certain monitor and display, on another monitor, the plurality sets of traveling video 121 in the left and right side directions of the remote driving vehicle 1. Alternatively, it might be considered that the display device 120 is configured so that the display on the display device 120 can be switched by the operation of the remote driving operator 4. For example, the display device 120 may be configured so that the patterns of the plurality sets of traveling video 121 to be displayed on the display device 120 can be switched by operation on the operation panel 140.

However, even when employing the display device 120 having the large display area, the display area of the display device 120 which is intentionally and visually recognizable by the remote driving operator 4 is limited. Therefore, the number and range of plurality sets of traveling video 121 displayable in the display area which can be easily and visually recognized by the remote driving operator 4 in a stable manner are limited. Accordingly, these may cause an excessive increase in operation and monitoring loads applied to the remote driving operator 4 in the case where the situation around the remote driving vehicle 1 and the driving situation of the remote driving vehicle 1 may vary from time to time.

Thus, in the traveling video display system according to the present embodiment, the attention direction or the attention scope of the remote driving operator 4 is specified on the basis of the information for a driving operation of the remote driving vehicle (operation information), the information on a traveling state of the remote driving vehicle 1 (traveling state information), or the information on motion of the remote driving operator 4 (motion information). The plurality sets of traveling video 121 reflecting the specified attention direction or the specified attention scope are displayed on the display device 120. And displaying the plurality sets of traveling video 121 on the display device 120 is performed based on the specified attention direction or the specified attention scope.

2. OVERVIEW

A display of the plurality sets of traveling video 121 by the traveling video display system according to the present embodiment will be described below with reference to FIGS. 3 to 7.

Figure 3:
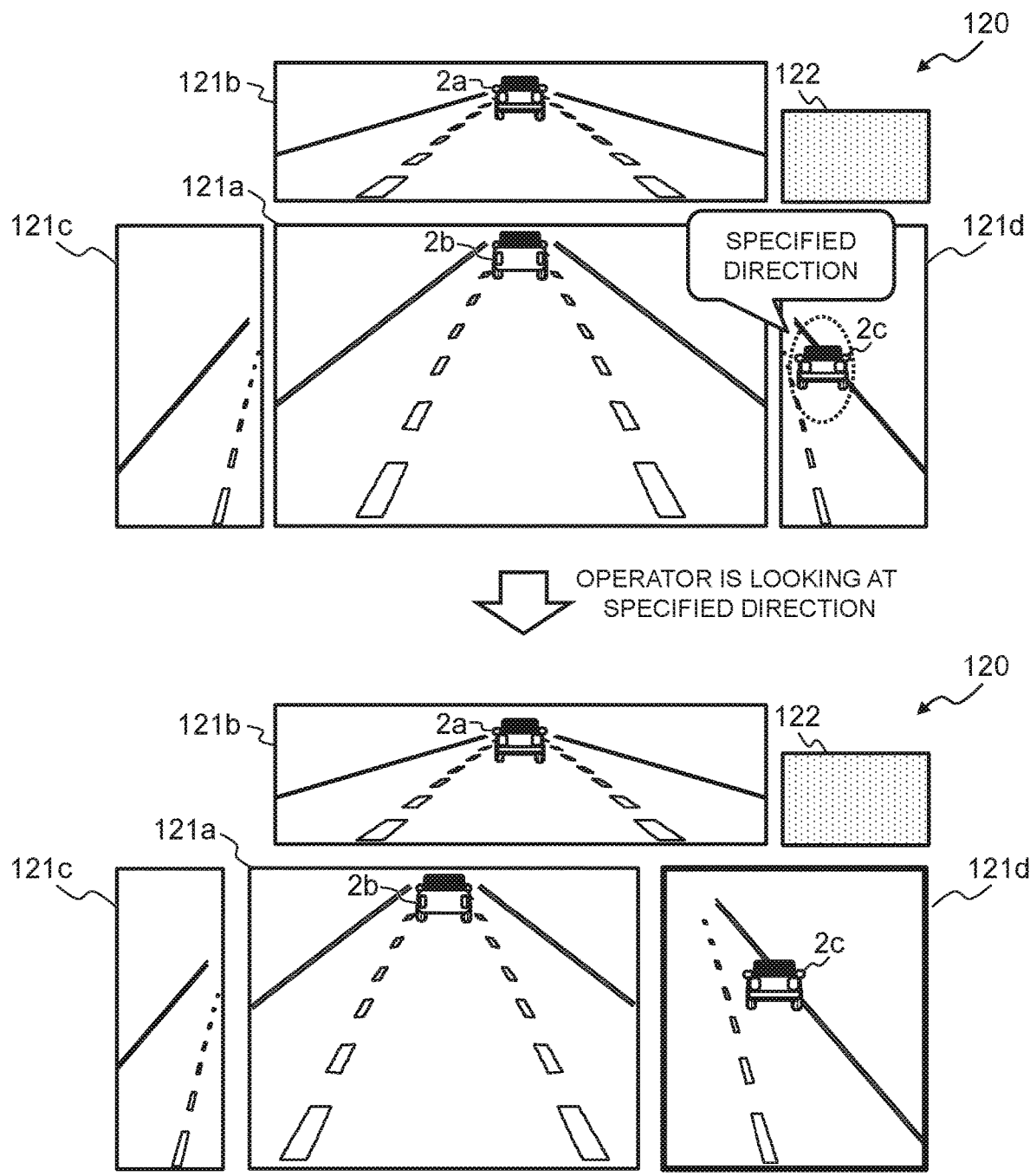
FIG. 3 is a conceptual diagram for explaining a display of the plurality sets of traveling video when a remote driving operator is looking at a specified direction of the plurality sets of traveling video.

First, reference is made to FIG. 3. FIG. 3 is a conceptual diagram for explaining a display of the plurality sets of traveling video 121 when the remote driving operator 4 is looking at the specified direction of the plurality sets of traveling video 121.

An upper part of FIG. 3 illustrates a display of the reference plurality sets of traveling video 121 and the specified direction (a position enclosed by a dotted line), and a lower part of FIG. 3 illustrates an example of a display of the plurality sets of traveling video 121 displayed based on the specified attention direction. Note that, in FIG. 3, the plurality of cameras equipped in the remote driving vehicle 1 and the display of the reference plurality sets of traveling video 121 are equivalent to the case illustrated in FIG. 2A and FIG. 2B.

In the example illustrated in FIG. 3, the specified direction at which the remote driving operator 4 is looking refers to a portion (a portion including another vehicle 2c) of the plurality sets of traveling video 121d. Thus, the traveling video display system according to the present embodiment specifies a portion of the plurality sets of traveling video 121d as the attention direction of the remote driving operator 4. Then, the portion of the plurality sets of traveling video 121d is displayed to be easily and visually recognized, as the display of the plurality sets of traveling video 121 based on the attention direction. In FIG. 3, the display area of the plurality sets of traveling video 121d is increased so that an angle of view is extended with respect to the reference.

In addition, the traveling video display system according to the present embodiment may highlight the plurality sets of traveling video 121 in the attention direction. In FIG. 3, the display frame of the traveling video 121d is highlighted.

Displaying the plurality sets of traveling video 121 in this way enables the remote driving operator 4 to easily and visually check the plurality sets of traveling video 121 in the direction to be checked. Accordingly, the driving safety of the remote driving vehicle 1 can be improved.

Note that the specified direction at which the remote driving operator 4 is looking can be detected on the basis of the motion information. For example, a specific direction can be detected from the movement and position of the head of the remote driving operator 4 and the direction of the line of sight of the remote driving operator 4. In this case, the traveling video display system may be configured by adopting a conventional sight line detection technique or the like. Therefore, the remote driving device 100 may include a suitable sensor (e.g., a sensor camera) configured to detect the state of the remote driving operator 4.

Figure 4:
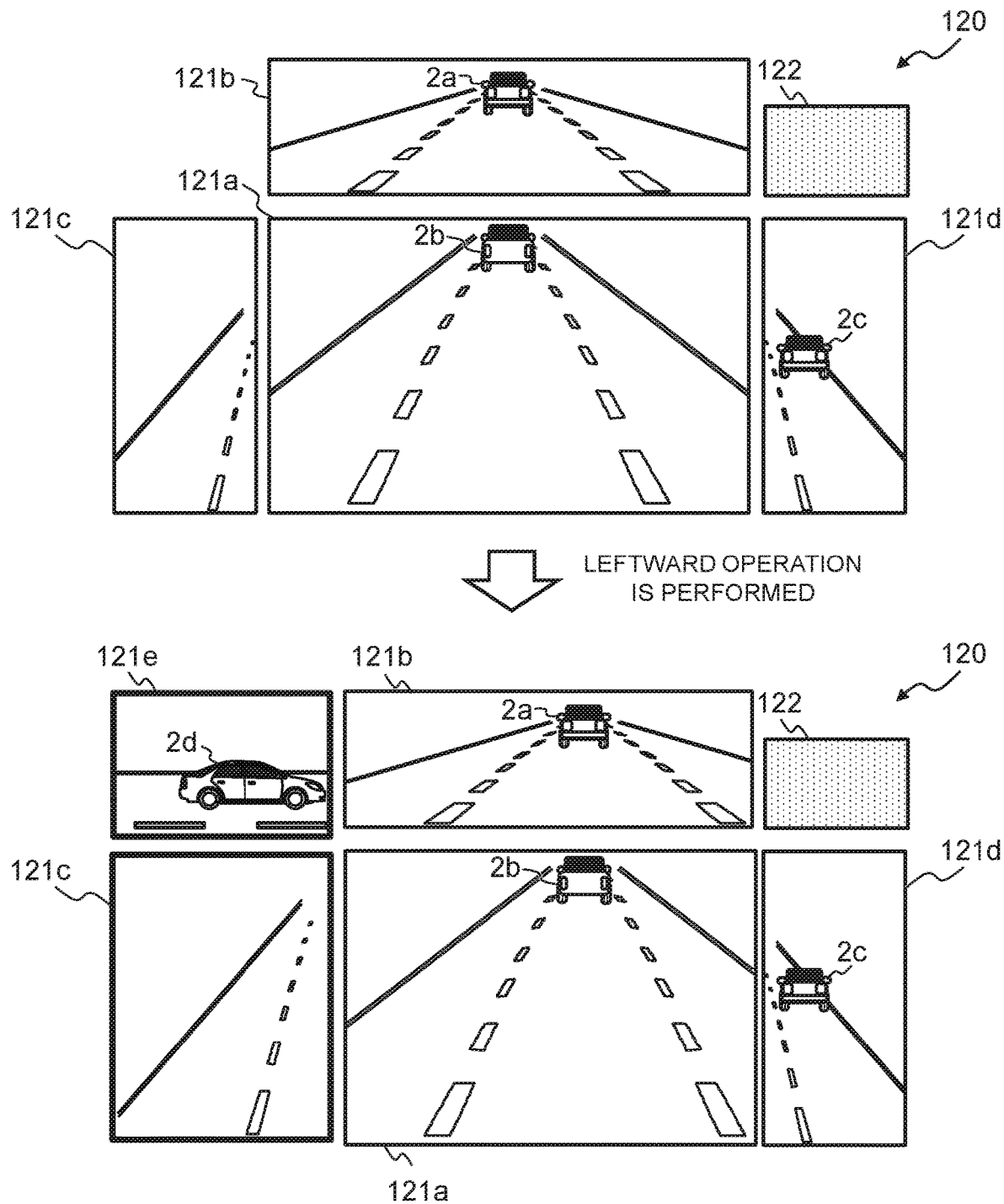
FIG. 4 is a conceptual diagram for explaining a display of the plurality sets of traveling video when the remote driving operator performs leftward operation.

Next, reference is made to FIG. 4. FIG. 4 is a conceptual diagram for explaining a display of the plurality sets of traveling video 121 when the remote driving operator 4 performs a driving operation for moving the remote driving vehicle 1 in the leftward direction.

An upper part of FIG. 4 illustrates a display of the reference plurality sets of traveling video 121, and a lower part of FIG. 4 illustrates an example of a display of the plurality sets of traveling video 121 displayed based on the specified attention direction. Note that, in FIG. 4, the plurality of cameras equipped in the remote driving vehicle 1 and the display of the reference plurality sets of traveling video 121 are equivalent to the case illustrated in FIG. 2A and FIG. 2B. In addition, the traveling video 121e refers to traveling video corresponding to the video capturing region 3e illustrated in FIG. 2A and FIG. 2B.

In the example illustrated in FIG. 4, the traveling video display system according to the present embodiment specifies the leftward direction of the remote driving vehicle 1 as the attention direction. Then, the traveling video display system displays at least the plurality sets of traveling video 121 related to the leftward direction of the remote driving vehicle 1. That is the traveling video display system displays the traveling video 121c and the traveling video 121e. The plurality sets of traveling video 121 related to the leftward direction are displayed to be easily and visually recognized, as the display based on the attention direction. In FIG. 4, the traveling video 121e is displayed, and the display area of the traveling video 121c is increased so that an angle of view is extended with respect to the reference. In addition, the traveling video 121c and the traveling video 121e are highlighted.

Furthermore, in the display of the traveling video 121a and the traveling video 121b, the display area is reduced, while the angle of view for the leftward direction is maintained. However, in the display of the traveling video 121a and the traveling video 121b, the angle of view may be extended in the leftward direction.

Here, the above explanation can be also applied to the case where the remote driving operator 4 performs a driving operation for moving the remote driving vehicle 1 in the rightward direction. That is, in this case, the traveling video display system according to the present embodiment specifies the rightward direction of the remote driving vehicle 1 as the attention direction. Then, the traveling video display system displays at least the plurality sets of traveling video 121 related to the rightward direction. And the plurality sets of traveling video 121 related to the rightward direction is displayed to be easily and visually recognized.

Displaying the plurality sets of traveling video 121 in this way enables the remote driving operator 4 to check a risk of involving a pedestrian, a motorcycle, or the like when turning the remote driving vehicle 1 to the left or right. When changing a lane of the remote driving vehicle 1, the remote driving operator 4 can check whether another vehicle 2 traveling on the adjacent lane is approaching.

Note that the traveling video display system according to the present embodiment may detect the driving operation for moving the remote driving vehicle 1 in the leftward direction or the rightward direction, based on the information on operation of turn signals or a steering apparatus. That is, the leftward direction of the remote driving vehicle 1 is specified as the attention direction when leftward operation of the turn signals or the steering apparatus is performed. And the rightward direction of the remote driving vehicle 1 is specified as the attention direction when rightward operation of the turn signals or the steering apparatus is performed.

Figure 5:
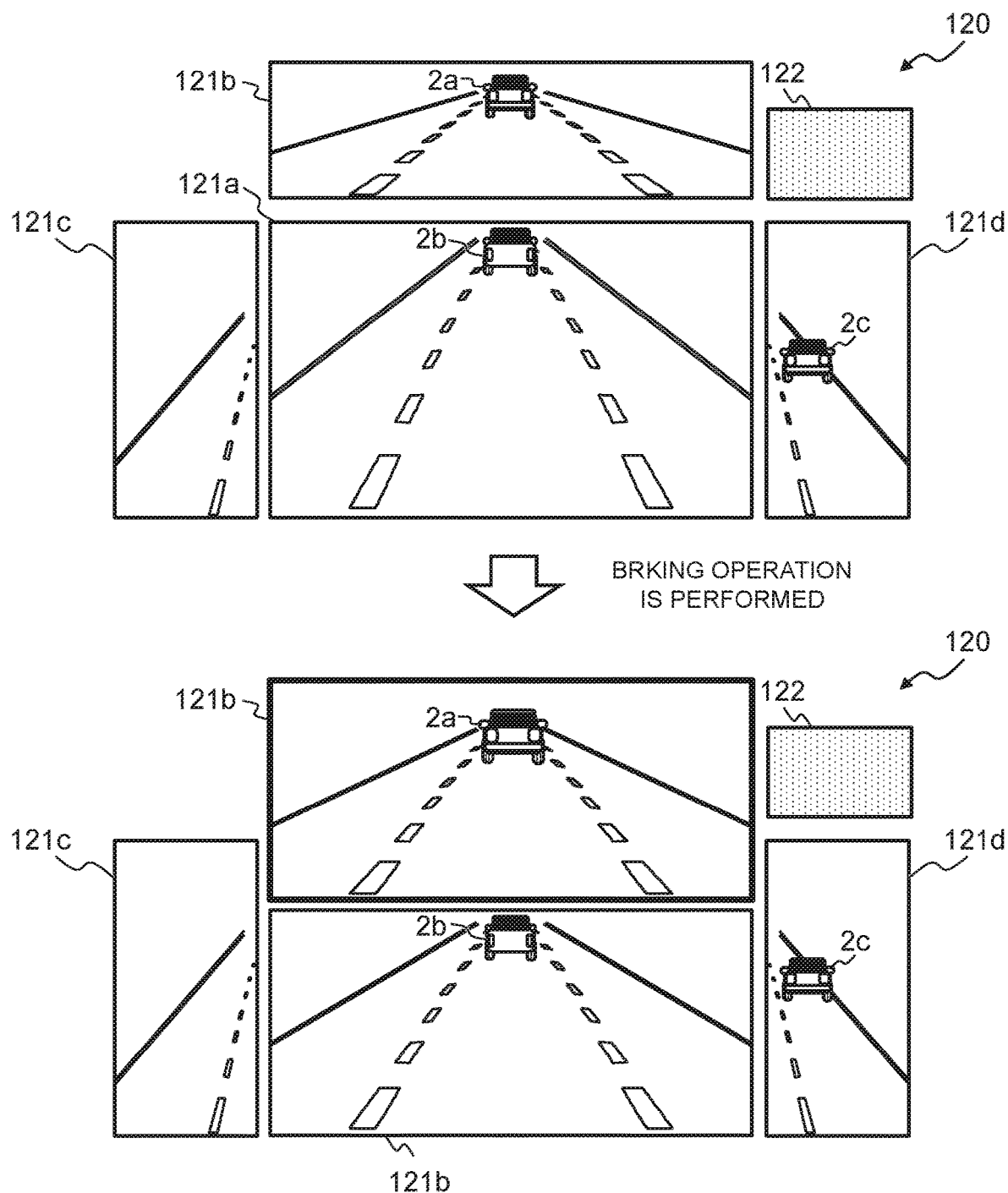
FIG. 5 is a conceptual diagram for explaining a display of the plurality sets of traveling video when the remote driving operator performs a predetermined braking operation of the remote driving vehicle.

Next, reference is made to FIG. 5. FIG. 5 is a conceptual diagram for explaining a display of the plurality sets of traveling video 121 when the remote driving operator 4 performs a predetermined braking operation of the remote driving vehicle 1.

An upper part of FIG. 5 illustrates a display of the reference plurality sets of traveling video 121, and a lower part of FIG. 5 illustrates an example of a display of the plurality sets of traveling video 121 displayed based on the specified attention direction. Note that, in FIG. 5, the plurality of cameras equipped in the remote driving vehicle 1 and the display of the reference plurality sets of traveling video 121 are equivalent to the case illustrated in FIG. 2A and FIG. 2B.

Here, examples of the predetermined braking operation include an operation of lighting the hazard flashers, an operation of depressing a brake pedal in amount of a threshold or greater, and an operation of braking causing deceleration of a threshold or greater. However, the predetermined braking operation may be determined according to the remote driving vehicle 1 to which the traveling video display system according to the present embodiment is applied.

In the example illustrated in FIG. 5, the traveling video display system according to the present embodiment specifies the rearward direction of the remote driving vehicle 1 as the attention direction. In the traveling video display system according to the present embodiment, the plurality sets of traveling video 121 related to the rearward direction of the remote driving vehicle 1 is displayed to be easily and visually recognized, as the display based on the attention direction. In FIG. 5, the display area of the traveling video 121b is increased. In addition, the traveling video 121b is highlighted.

Displaying the plurality sets of traveling video 121 in this way enables the remote driving operator 4 to check a risk of causing a rear-end collision with another vehicle 2 traveling behind the remote driving vehicle 1 when, for example, stopping the remote driving vehicle 1.

Note that the fact that the predetermined braking operation is performed may be detected based on the operation information or the traveling state information. For example, the detection is performed by acquiring, as the operation information, the operation of lighting the hazard flashers or depressing the brake pedal. Alternatively, the detection is performed by acquiring the deceleration as the traveling state information.

Figure 6:
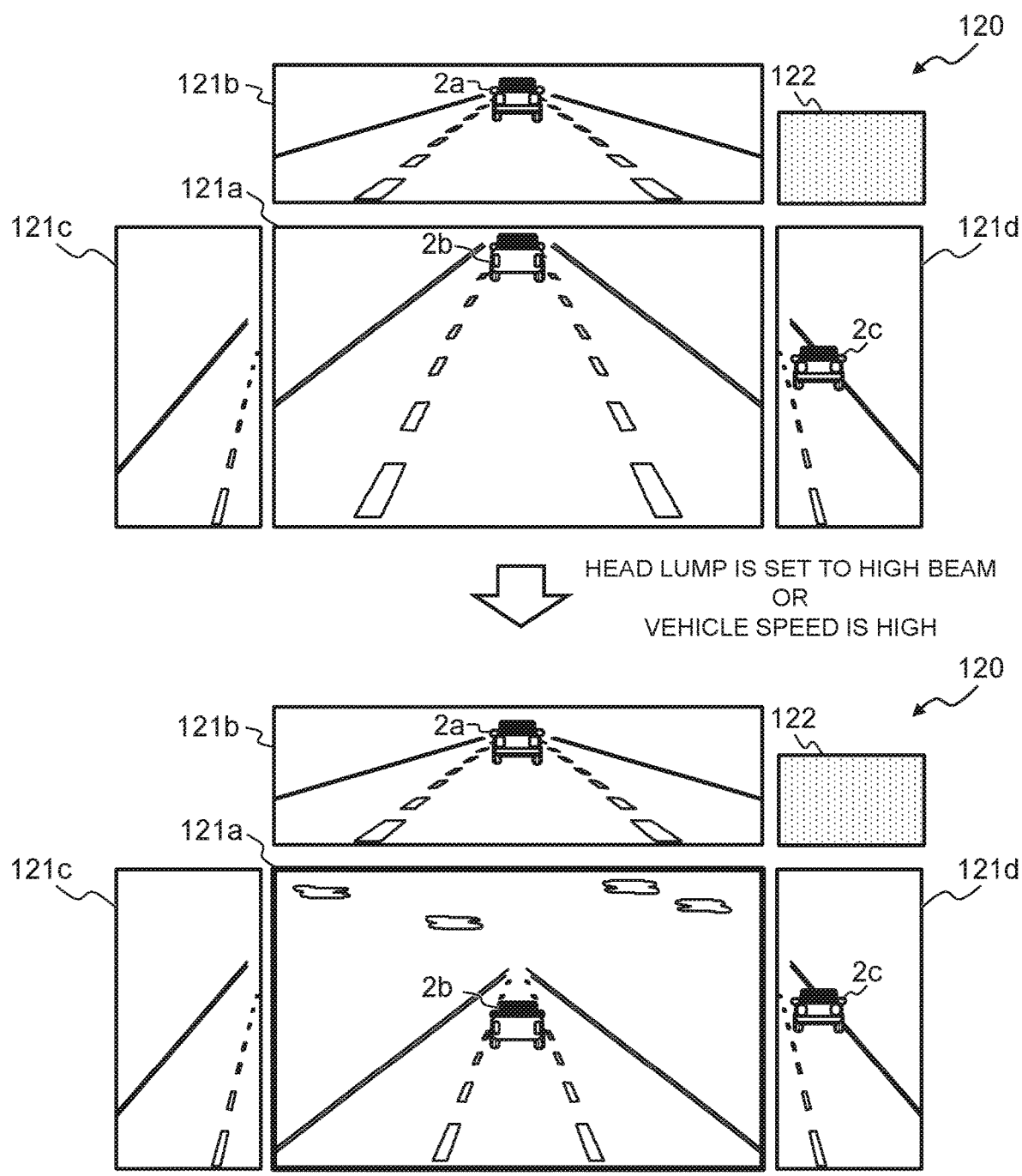
FIG. 6 is a conceptual diagram for explaining a display of the plurality sets of traveling video when a head lamp of the remote driving vehicle is set to high beam.

Next, reference is made to FIG. 6. FIG. 6 is a conceptual diagram for explaining a display of the plurality sets of traveling video 121 when a head lamp of the remote driving vehicle 1 is set to high beam.

An upper part of FIG. 6 illustrates a display of the reference plurality sets of traveling video 121, and a lower part of FIG. 6 illustrates an example of a display of the plurality sets of traveling video 121 displayed based on the specified attention scope. Note that, in FIG. 6, the plurality of cameras equipped in the remote driving vehicle 1 and the display of the reference plurality sets of traveling video 121 are equivalent to the case illustrated in FIG. 2A and FIG. 2B.

When the head lamp is set to high beam, the traveling video display system according to the present embodiment specifies, as the attention scope, a distant place of the traveling video 121a in the frontward direction. Then, the traveling video 121a in the frontward direction is displayed as the display of the plurality sets of traveling video 121 based on the attention scope, by setting the angle of view upward by a predetermined height with respect to the reference. Here, the predetermined height may be determined according to the remote driving vehicle 1 to which the traveling video display system according to the present embodiment is applied.

The traveling video display system according to the present embodiment acquires, as the traveling state information, the information on a vehicle speed of the remote driving vehicle 1, and displays the plurality sets of traveling video 121 based on the vehicle speed. In this case, the traveling video 121a in the frontward direction is displayed by setting the angle of view upward or downward by a height according to the vehicle speed with respect to the reference. That is, the traveling video 121a in the frontward direction is displayed by setting the angle of view upward with respect to the reference as the vehicle speed is higher, and the traveling video 121a in the frontward direction is displayed by setting the angle of view downward with respect to the reference as the vehicle speed is lower.

Here, the height according to the vehicle speed may be determined according to the remote driving vehicle 1 to which the traveling video display system according to the present embodiment is applied. For example, the angle of view may be continuously changed in proportion to the vehicle speed, or the angle of view may be gradually changed according to the vehicle speed.

Displaying the plurality sets of traveling video 121 in this way makes it possible to respond to a change in forward gazing point of the remote driving operator 4. Therefore, the traveling video 121a in the frontward direction can be easily and visually recognized.

Figure 7:
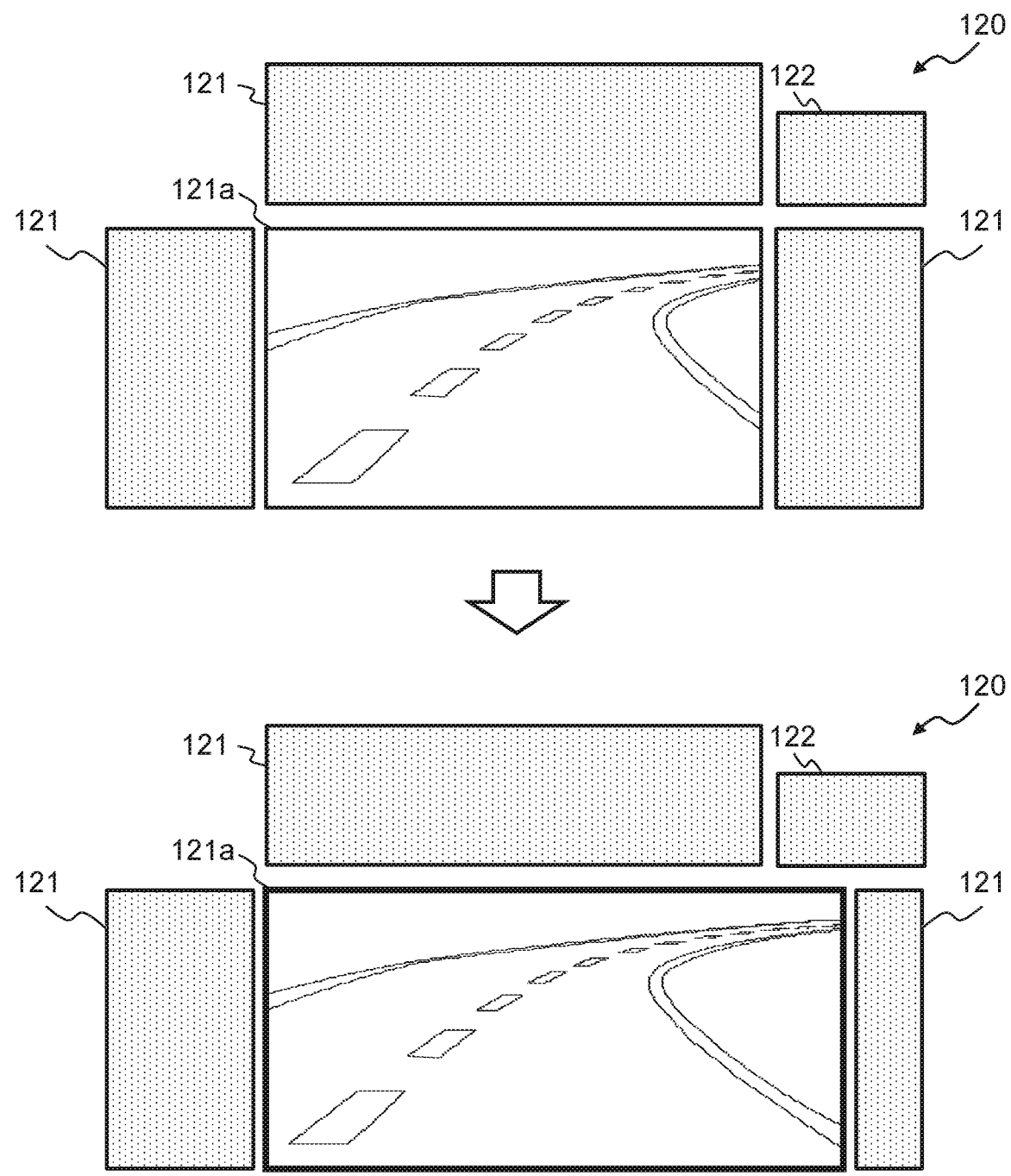
FIG. 7 is a conceptual diagram for explaining a display of the plurality sets of traveling video when the remote driving vehicle is traveling on a curved road.

Next, reference is made to FIG. 7. FIG. 7 is a conceptual diagram for explaining a display of the plurality sets of traveling video 121 when the remote driving vehicle 1 is traveling on a curved road.

An upper part of FIG. 7 illustrates a display of the reference plurality sets of traveling video 121, and a lower part of FIG. 7 illustrates an example of a display of the plurality sets of traveling video 121 displayed based on the specified attention direction.

In the example illustrated in FIG. 7, the traveling video display system according to the present embodiment specifies the direction the curved road is going as the attention direction. Then, the plurality sets of traveling video 121 is displayed based on the attention direction are displayed. In FIG. 7, the traveling video 121a in the frontward direction is displayed by extending, with respect to the reference, the angle of view in the direction the curved road is going.

Displaying the plurality sets of traveling video 121 in this way can improve the driving operability when the remote driving vehicle 1 is traveling on the curved road.

Note that the fact that the remote driving vehicle 1 is traveling on the curved road may be detected based on the traveling state information. For example, when lateral acceleration of the remote driving vehicle 1 is acquired as the traveling state information and the lateral acceleration of the threshold or greater is detected, it is determined that the remote driving vehicle 1 is traveling on the curved road. Furthermore, the determination may be made by image recognition of the plurality sets of traveling video 121.

Here, the display of the plurality sets of traveling video 121 by the traveling video display system according to the present embodiment may be applied to the display in the display range on the display device 120 which can be easily and visually recognized by the remote driving operator 4 in a stable manner. For example, when the display device 120 is formed of a multi-monitor, the display may be applied to the monitor located in front of the remote driving operator 4. On the other hand, even in such a case, the attention direction or the attention scope of the remote driving operator 4 may cover the entire display on the display device 120.

For example, in the case where the attention direction or the attention scope of the remote driving operator 4 is in the plurality sets of traveling video 121 displayed on the monitor which is not located in front of the remote driving operator 4, the plurality sets of traveling video 121 in the attention direction or the attention scope may be displayed on the monitor located in front of the remote driving operator 4.

3. TRAVELING VIDEO DISPLAY SYSTEM

The traveling video display system according to the present embodiment will be described below. However, the matters redundant with the above-described contents will be appropriately omitted.

Figure 8:
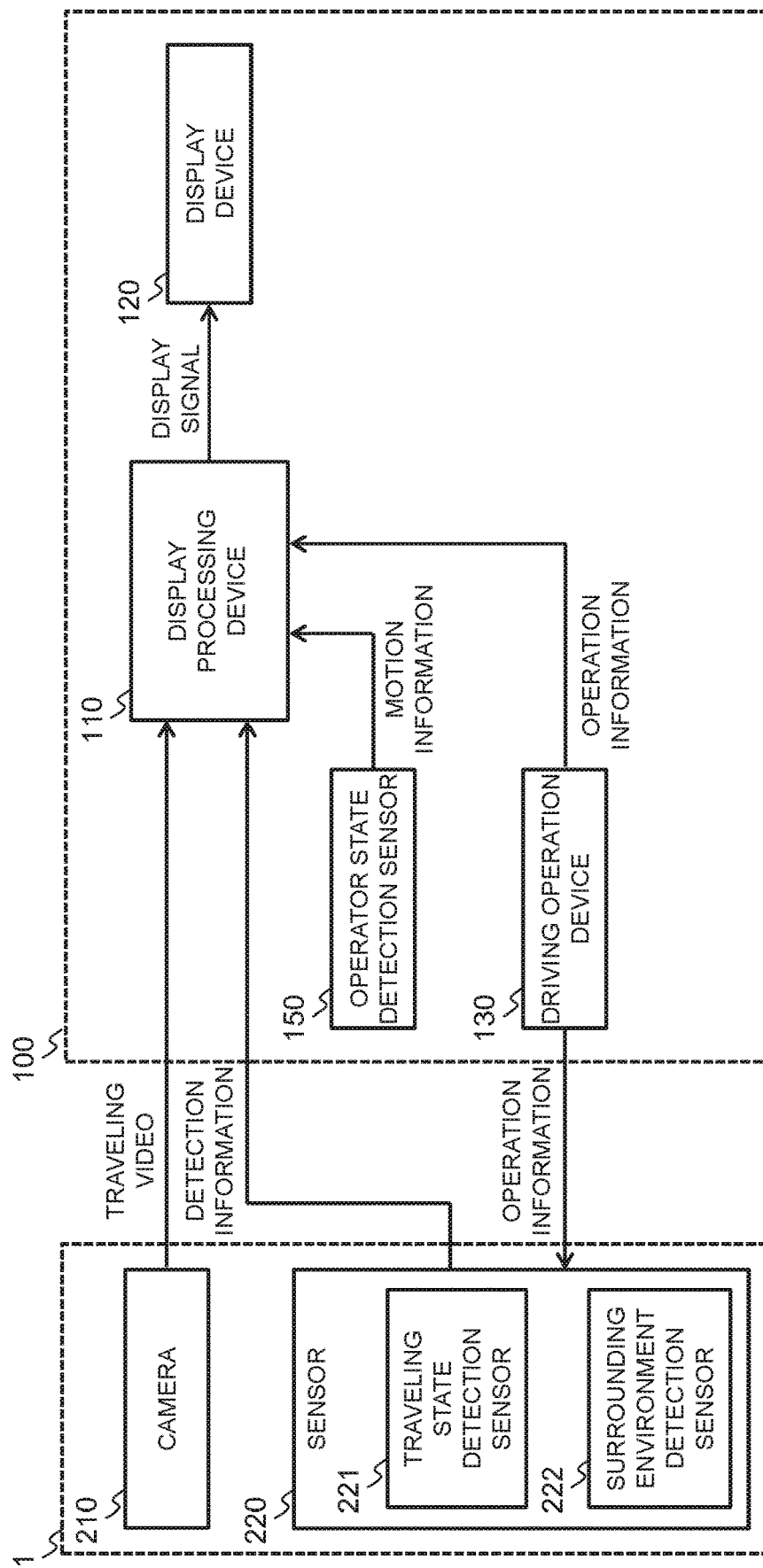
FIG. 8 is a block diagram illustrating a schematic configuration of a traveling video display system according to the present embodiment.

FIG. 8 is a block diagram illustrating a schematic configuration of the traveling video display system 10 according to the present embodiment.

A camera 210 is equipped in the remote driving vehicle 1, and outputs plurality sets of traveling video 121 of the remote driving vehicle 1. The camera 210 includes a plurality of cameras configured to capture a plurality of directions and record the plurality sets of traveling video 121.

The plurality sets of traveling video 121 output by the camera 210 is transmitted to the display processing device 110. The camera 210 may be configured to transmit the plurality sets of traveling video 121 in the specific direction requested by the display processing device 110.

A sensor 220 is equipped in the remote driving vehicle 1, and detects a driving environment of the remote driving vehicle 1 and outputs the detection information. The sensor 220 includes a traveling state detection sensor 221, and a surrounding environment detection sensor 222.

The traveling state detection sensor 221 detects the traveling state (a vehicle speed, deceleration, lateral acceleration, a yaw rate, or the like) of the remote driving vehicle 1, and outputs the traveling state information as the detection information. Examples of the traveling state detection sensor 221 include a wheel speed sensor, a G sensor, and a gyro sensor.

The surrounding environment detection sensor 222 detects a surrounding environment (a preceding vehicle, a lane, an obstacle, or the like) of the remote driving vehicle 1, and outputs, as the detection information, the information of the surrounding environment (a distance from a preceding vehicle, a position of a lane, a type of an obstacle, or the like). Examples of the surrounding environment detection sensor 222 include a sensor camera, a light detection and ranging (LIDAR), and a millimeter wave radar.

The driving operation device 130 is a device configured to accept a driving operation by the remote driving operator 4 and output the operation information. Examples of the driving operation device 130 include turn signals, a steering wheel, a shift operation device, a gas pedal, a brake pedal, a light operation device, and the like.

The operation information output by the driving operation device 130 is transmitted to the remote driving vehicle 1 and the display processing device 110. Here, when a control device (not illustrated in FIG. 7) causes the remote driving vehicle 1 to travel according to the operation information, the remote driving by the remote driving operator 4 can be implemented.

An operator state detection sensor 150 is configured to detect a state of the remote driving operator 4 and output the motion information. Examples of the operator state detection sensor 150 include a sensor camera configured to capture a video of the remote driving operator 4.

The display processing device 110 is configured to execute the processing based on the information to be acquired, and generate and output a display signal. The display signal output by the display processing device 110 is transmitted to the display device 120. In particular, the display processing device 110 executes specifying process of specifying the attention direction or the attention scope, and a display processing of the plurality sets of traveling video 121. The specifying process and the display processing will be described later.

The display processing device 110 is typically a computer including a memory and a processor. The memory typically includes a random access memory (RAM) which temporarily stores data, and a read only memory (ROM) which stores a program executable by the processor and various data related to the program. The processor reads the program and data from the memory, and executes the processing according to the program based on the data.

The display processing device 110 is typically provided in the remote driving device 100. However, the display processing device 110 may be a device external to the remote driving device 100. For example, the display processing device 110 may be a server configured on the communication network. Note that, as described in FIG. 1, the display processing device 110 may be a processing apparatus configured to execute processing related to the other remote driving.

Note that the display processing device 110 may be configured to acquire all of the plurality sets of traveling video 121 stored by the camera 210 or may be configured to acquire only the plurality sets of traveling video 121 in the specific direction to display them on the display device 120. In this case, the display processing device 110 may be configured to request the plurality sets of traveling video 121 in the specific direction to the camera 210.

4. TRAVELING VIDEO DISPLAY METHOD

A traveling video display method to be implemented by the traveling video display system 10 according to the present embodiment will be described below.

Figure 9:
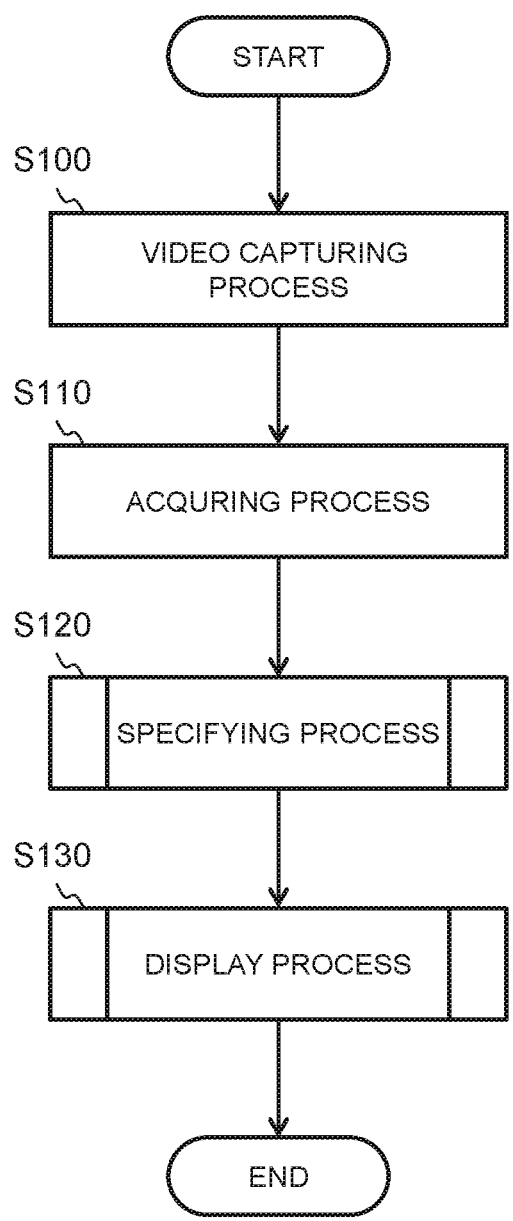
FIG. 9 is a flowchart illustrating a traveling video display method to be implemented by the traveling video display system according to the present embodiment.

FIG. 9 is a flowchart illustrating a traveling video display method to be implemented by the traveling video display system 10 according to the present embodiment. The processing illustrated in FIG. 9 is executed for each predetermined control cycle.

In step S100 (a video capturing process), the camera 210 records the plurality sets of traveling video 121. After step S100, the process proceeds to step S110.

In step S110 (an acquiring process), the display processing device 110 acquires the operation information, the traveling state information, and the motion information from the driving operation device 130, the operator state detection sensor 150, and the sensor 220 respectively. After step S110, the process proceeds to step S120.

In step S120 (a specifying process), the display processing device 110 specifies the attention direction or the attention scope of the remote driving operator 4 based on the information acquired in the acquiring process. In the specifying process, the attention direction or the attention scope is specified when any of the following conditions is satisfied.

One condition is that the remote driving operator 4 is looking at the specific direction of the plurality sets of traveling video 121. The display processing device 110 determines whether the remote driving operator 4 is looking at the specific direction of the plurality sets of traveling video 121, based on the motion information. For example, the display processing device 110 determines that the remote driving operator 4 is looking at the specific direction, when the display processing device 110 acquires, as the motion information, the information on the line of sight of the remote driving operator 4, and the line of sight is continuously directed in the specific direction for a predetermined period. The display processing device 110 specifies, as the attention direction, the specific direction at which the remote driving operator 4 is looking.

Another condition is that the leftward/rightward operation of the turn signals or the steering apparatus is performed. The display processing device 110 determines whether the condition is satisfied, when acquiring the information on the operation of turn signals or the steering apparatus as the operation information. The display processing device 110 specifies, as the attention direction, the leftward direction of the remote driving vehicle 1 when the leftward operation is performed, and specifies, as the attention direction, the rightward direction when the rightward operation is performed.

Another condition is that the predetermined braking operation of the remote driving vehicle 1 is performed. The display processing device 110 determines whether the predetermined braking operation is performed, based on the operation information or the traveling state information. For example, the display processing device 110 determines whether the condition is satisfied, when acquiring, as the operation information, the operation of lighting the hazard flashers or the depressing the brake pedal, or acquiring, as the traveling state information, the deceleration of the remote driving vehicle 1. The display processing device 110 specifies, as the attention direction, the rearward direction of the remote driving vehicle 1 in response to the predetermined braking operation of the remote driving vehicle 1.

Another condition is that the head lamp is set to high beam. The display processing device 110 determines whether the head lamp is set to high beam, when acquiring, as the operation information, the on or off state of the high beams. The display processing device 110 specifies, as the attention scope, a distant place of the traveling video 121a in the frontward direction in response to the fact that the head lamp is set to high beam.

Another condition is that the remote driving vehicle 1 is traveling on a curved road. The display processing device 110 determines whether the remote driving vehicle 1 is traveling on the curved road, based on the traveling state information or the plurality sets of traveling video 121. For example, the display processing device 110 determines that the remote driving vehicle 1 is traveling on the curved road, when the display processing device 110 acquires, as the traveling state information, lateral acceleration of the remote driving vehicle 1, and the lateral acceleration becomes the threshold or greater. Alternatively, the display processing device 110 determines, by the image recognition of the plurality sets of traveling video 121, that the remote driving vehicle 1 is traveling on the curved road. The display processing device 110 specifies, as the attention direction, the direction the curved road is going, in response to the fact that the remote driving vehicle 1 is traveling on the curved road.

Here, the priority may be placed on the above-described conditions. When the plurality of conditions is satisfied, the attention direction or the attention scope may be specified according to the priority. Alternatively, when the plurality of conditions is satisfied, the plurality of attention directions or the attention scopes may be specified.

After step S120, the process proceeds to step S130.

Figure 10:
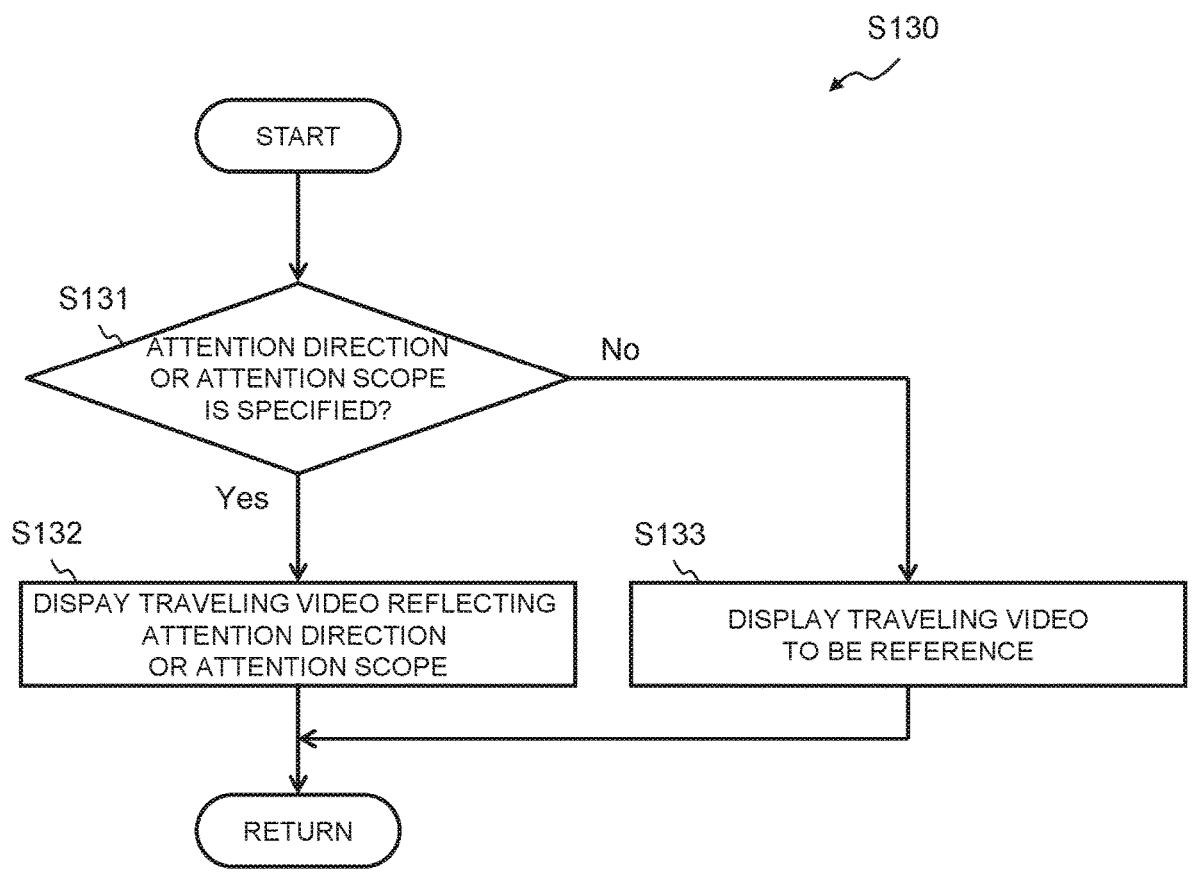
FIG. 10 is a flowchart illustrating a display process in the traveling video display method.

In step S130 (a display process), the display processing device 110 displays the plurality sets of traveling video 121 on the display device 120. The display process will be described with reference to FIG. 10. The processing illustrated in FIG. 10 is started by performing the display process.

In step S131, the display processing device 110 determines whether the attention direction or the attention scope is specified in the specifying process. When the attention direction or the attention scope is specified (step S131; Yes), the process proceeds to step S132. When the attention direction or the attention scope is not specified (step S131; No), the process proceeds to step S133.

In step S132, the display processing device 110 displays, on the display device 120, the plurality sets of traveling video 121 reflecting the attention direction or the attention scope. Here, the plurality sets of traveling video 121 reflecting the attention direction or the attention scope are as described in FIGS. 3 to 7. After step S132, the display process ends.

In step S133, the display processing device 110 displays the plurality sets of traveling video 121 to be reference (as shown in FIG. 2A and FIG. 2B). After step S133, the display process ends.

Note that the display processing device 110 may be configured to acquire at least one of the operation information, the traveling state information, and the motion information in the acquiring process. Then, in the specifying process, the application condition may be limited according to the acquired information.

5. EFFECTS

As described above, the driving video display system and the driving video display method according to the present embodiment specify the attention direction or the attention scope of the remote driving operator 4. The plurality sets of traveling video 121 reflecting the specified attention direction or the specified attention scope are displayed on the display device 120. And displaying the plurality sets of traveling video 121 are performed based on the specified attention direction or the specified attention scope. This enables the plurality sets of traveling video 121 in the attention direction or the attention scope of the remote driving operator 4 to be properly displayed on the display device 120 without increasing operation and monitoring loads applied to the remote driving operator 4.

6. MODIFIED EXAMPLES

The traveling video display system and display processing method according to the present embodiment may adopt the following modified forms. Note that, in the following description, the matters redundant with the above-described contents will be appropriately omitted.

6-1. Modified Example 1

In the display process, the display processing device 110 may be configured to display, on the display device 120, the plurality sets of traveling video 121 reflecting a predetermined direction or a predetermined scope. For example, the traveling video 121a in a frontward direction may be displayed regardless of the result of the specifying process. Furthermore, a range in which the traveling video 121a in the frontward direction is to be displayed may be fixed regardless of the result of the specifying process.

Adopting the modified form in this way can prevent the plurality sets of traveling video 121 constantly requiring the monitoring from not being displayed according to the result of the specifying process or can prevent the display from being reduced.

6-2. Modified Example 2

The traveling video display system according to the present embodiment may be applied in the case where the remote driving vehicle 1 is a towing vehicle and the camera 210 includes at least one camera equipped in a towed vehicle. In this case, in the display process, the display processing device 110 may be configured to display, on the display device 120, the plurality sets of traveling video 121 recorded by the at least one camera equipped in the towed vehicle, in response to the fact that the attention direction is the leftward direction or the rightward direction of the remote driving vehicle 1.

Adopting the modified form in this way enables the remote driving operator 4 to check a motion of the towed vehicle in the case where the remote driving vehicle 1 which is a towing vehicle is moved in the leftward direction or the rightward direction. Therefore, the operability of the remote driving can be improved.

What is claimed is:

1. A method comprising:
   acquiring a plurality of sets of traveling video recorded by a plurality of cameras capturing a plurality of directions equipped in a remote driving vehicle;
   acquiring an image of a remote driving operator who is remotely operating the remote driving vehicle;
   determining a direction of line of sight of the remote driving operator based on the image of the remote driving operator;
   determining a direction that the remote driving operator is looking based on the determined line of sight of the remote driving operator;
   displaying, to the remote driving operator, a first video in a first size, the first video corresponding to one of the plurality of sets of traveling video captured in a first direction with respect to the remote driving vehicle, the first direction corresponding to the direction that the remote driving operator is looking; and
   displaying, to the remote driving operator, a second video in a second size smaller than the first size, the second video corresponding to one of the plurality of sets of traveling video captured in a second direction with respect to the remote driving vehicle, the second direction corresponding to a different direction than the direction that the remote driving operator is looking.

2. The method according to claim 1, further comprising: highlighting a display frame of the first video.

3. The method according to claim 1, further comprising displaying at least one of the plurality sets of traveling video reflecting a predetermined direction or a predetermined scope.

4. The method according to claim 1, further comprising:
   acquiring operation of turn signals or a steering apparatus,
      when leftward operation of the turn signals or the steering apparatus is performed, determining that the remote driving operator is looking in a leftward direction of the remote driving vehicle, and
      when rightward operation of the turn signals or the steering apparatus is performed, determining that the remote driving operator is looking in a rightward direction of the remote driving vehicle.

5. The method according to claim 1, further comprising:
   when a predetermined braking operation of the remote driving vehicle is performed, determining that the remote driving operator is looking in a rearward direction.

6. The method according to claim 1, further comprising:
   when a head lamp of the remote driving vehicle is set to high beam, determining that the remote driving operator is looking in a frontward direction of the remote driving vehicle, and
   setting an angle of view of the one of the plurality sets of traveling video reflecting the frontward direction upward by a predetermined height with respect to a reference.

7. The method according to claim 1, further comprising:
   acquiring a vehicle speed of the remote driving vehicle, and
   setting an angle of view of one of the plurality sets of traveling video reflecting a frontward direction upward or downward by a height according to the vehicle speed with respect to a reference.

8. The method according to claim 1, further comprising :
   when the remote driving vehicle is traveling on a curved road, determining that the remote driving operator is looking in a direction which the curved road is going.

9. The method according to claim 4, wherein
   the remote driving vehicle is a towing vehicle,
   the plurality of cameras includes at least one camera equipped in a towed vehicle towed by the towing vehicle, and
   when the remote driving operator is looking in the leftward direction or the rightward direction of the towing vehicle, displaying traveling video recorded by the at least one camera equipped in the towed vehicle.

10. A system comprising
a plurality of cameras capturing a plurality of directions equipped in a remote driving vehicle; and
a processing apparatus configured to execute:
- acquiring an image of a remote driving operator who is remotely operating the remote driving vehicle;
- determining a direction of line of sight of the remote driving operator based on the image of the remote driving operator;
- determining a direction that the remote driving operator is looking based on the determined line of sight of the remote driving operator;
- displaying, to the remote driving operator, a first video in a first size, the first video corresponding to one of the plurality of sets of traveling video captured in a first direction with respect to the remote driving vehicle, the first direction corresponding to the direction that the remote driving operator is looking; and
- displaying, to the remote driving operator, a second video in a second size smaller than the first size, the second video corresponding to one of the plurality of sets of traveling video captured in a second direction with respect to the remote driving vehicle, the second direction corresponding to a different direction than the direction that the remote driving operator is looking.

11. The system according to claim 10, wherein the processing apparatus is further configured to highlight a display frame of the first video.

12. The system according to claim 10, wherein the processing apparatus is further configured to display at least one of the plurality sets of traveling video reflecting a predetermined direction or a predetermined scope.

13. The system according to claim 10, wherein the processing apparatus is further configured to:
acquire operation of turn signals or a steering apparatus,
- when leftward operation of the turn signals or the steering apparatus is performed, determine that the remote driving operator is looking in a leftward direction of the remote driving vehicle, and
- when rightward operation of the turn signals or the steering apparatus is performed, determine that the remote driving operator is looking in a rightward direction of the remote driving vehicle.

14. The system according to claim 10, wherein the processing apparatus is further configured to:
when a predetermined braking operation of the remote driving vehicle is performed, determine that the remote driving operator is looking in a rearward direction.

15. The traveling video display system according to claim 10, wherein the processing apparatus is further configured to:
when a head lamp of the remote driving vehicle is set to high beam, determine that the remote driving operator is looking in a frontward direction of the remote driving vehicle, and set an angle of view of the one of the plurality sets of traveling video reflecting the frontward direction upward by a predetermined height with respect to a reference.

16. The system according to claim 10, wherein the processing apparatus is further configured to:
acquire a vehicle speed of the remote driving vehicle, and
set an angle of view of one of the plurality sets of traveling video reflecting a frontward direction upward or downward by a height according to the vehicle speed with respect to a reference.

17. The system according to claim 10, wherein the processing apparatus is further configured to:
when the remote driving vehicle is traveling on a curved road, determine that the remote driving operator is looking in a direction which the curved road is going.

18. The system according to claim 13, wherein
the remote driving vehicle is a towing vehicle,
the plurality of cameras includes at least one camera equipped in a towed vehicle towed by the towing vehicle, and
when the remote driving operator is looking in the leftward direction or the rightward direction of the towing vehicle, the processing apparatus is configured to display traveling video recorded by the at least one camera equipped in the towed vehicle on the display device.

* * * * *